United States Patent [19]

Vilums

[11] Patent Number: 4,878,735
[45] Date of Patent: Nov. 7, 1989

[54] OPTICAL IMAGING SYSTEM USING LENTICULAR TONE-PLATE ELEMENTS

[75] Inventor: Ivars J. Vilums, DeForest, Wis.

[73] Assignee: LookingGlass Technology, Inc., Madison, Wis.

[21] Appl. No.: 144,942

[22] Filed: Jan. 15, 1988

[51] Int. Cl.$^4$ .................. G02B 27/22; G02B 27/44
[52] U.S. Cl. .................. 350/131; 350/162.16; 350/167
[58] Field of Search .................. 350/162.16, 167, 131, 350/3.73

[56] References Cited

U.S. PATENT DOCUMENTS

| | | | |
|---|---|---|---|
| 2,351,034 | 6/1944 | Gabor | 350/167 |
| 3,263,088 | 7/1966 | Goldfischer | 250/237 R |
| 3,536,371 | 10/1970 | Post | 350/3.73 |
| 3,545,854 | 12/1970 | Olsson | 355/46 |
| 3,547,546 | 12/1970 | Schier | 350/162.16 |
| 3,569,997 | 3/1971 | Lehovec | 350/162.16 X |
| 3,613,539 | 10/1971 | Dudley | 354/354 |
| 3,884,545 | 5/1975 | Kasahara et al. | 350/3.76 |
| 3,993,401 | 11/1976 | Strehlow | 350/320 |
| 4,036,552 | 7/1977 | Lee et al. | 350/97 |
| 4,095,875 | 6/1978 | Lee et al. | 350/320 |
| 4,204,638 | 5/1980 | Laude | 235/454 |
| 4,539,482 | 9/1985 | Nose | 250/578 |
| 4,609,259 | 9/1986 | Suemitsu et al. | 350/417 |
| 4,626,082 | 12/1986 | Mochizuki et al. | 350/167 X |

OTHER PUBLICATIONS

*The Amateur Scientist* by Jearl Walker, pp. 192-198, Scientific American.
*An analysis of 3-D display strategies* by Thomas F. Budinger, SPIE vol. 507, pp. 2-8, Processing and Display of Three-Dimensional Data II (1984).
*Wide-Angle Integral Photography—The Integram\* System* by Roger L. deMontebello, SPIE vol. 120, Three-Dimensional Imaging (1977), pp. 73-91.
*Two modes of operation of a lens array for obtaining integral photography* by N. K. Ignat'ev, Sov. J. Opt. Technol. 50(1), Jan. 1983, pp. 6-8.
*Synthesis of Fresnel Diffraction Patterns by Overlapping Zone Plates* by Conger, R. L., et al., APPLIED OPTICS, Apr. 1968, vol. 7, No. 4, pp. 623-624.
*Space Bandwidth Requirements for Three-Dimensional Imagery* by Leith, E. N., APPLIED OPTICS, Nov. 1971, vol. 10, No. 11, pp. 2419-2422.
*Simple flying spot scanner for electron beam lithography on a scanning electron microscope without beam blanking capability* by Grabbe, P., Rev. Sci. Instrum. 51(7), Jul. 1980, pp. 992-993.
*Optimum Parameters and Resolution Limitatin of Integral Photography* by C. B. Burckhardt, Journal of the Opt. Soc. of Am., vol. 58, No. 1, Jan. '68, pp. 71-76.
*Obtaining a portrait of a person by the integral photography method*, by Yu A. Dudnikov, et al., Sov. J. Opt. Technol. 47(9), Sep. 1980, pp. 562-563.
*New method for focusing x rays and gamma rays* by Smither, R. K., Rev. Sci. Instrum. 53(2), Feb. 1982, pp. 131-141.
*Limiting capabilities of photographing various subjects by the integral photography method* by Dudnikov, Yu A., et al., Sov. J. Opt. Technol. 46(12), Dec. 1979, pp. 736-738.
*Holography and Integral Photography* by Collier, Robert J., Physics Today, Jul. 1968, pp. 54-63.
*Formation and Inversion of Pseudoscopic Images* by Burckhardt, C. B., et al., Apr. 1988, vol. 7, No. 3, APPLIED OPTICS, pp. 627-631.
*Waves and Images*, The Applications of Holography, Henry J. Caulfield and Fun Lu, 1970, pp. 1-9.

(List continued on next page.)

Primary Examiner—Bruce Y. Arnold
Assistant Examiner—David J. Edmondson
Attorney, Agent, or Firm—Lathrop & Clark

[57] ABSTRACT

An optical imaging system comprised of successive planes of massively parallel elements, wherein each element handles only a small component of the resulting image is described. The resulting image is a composite or integral image made up of typically several hundred thousand component points each individually generated by a separate serial optical processing stream.

52 Claims, 7 Drawing Sheets

OTHER PUBLICATIONS

Physican Recording Media and Reconstruction Efficiencies of Holograms, *The Applications of Holography*, Henry J. Caulfield and Fun Lu, 1970, pp. 31–48.

Applications to 3-D Photography, *The Application of Holography*, Henry J. Caulfield and Fun Lu, 1970, pp. 70–108.

The Future of Holography, *The Applications of Holography*, Henry J. Caulfield and Fun Lu, 1970, pp. 131–133.

The effect of Semiconductor Processing upon the focusing properties of Fresnel Zone Plates used as alignment targets, unpublished report, pp. 1–16.

Holography and other 3D Techniques: actual developments and impact on business, Jean-Louis Tribillon, *Proceedings of SPIE—The International Society for Optical Engineering* v 402, Publ. by SPIE, Bellingham, Wash., USA, pp. 13–18, 1983.

Optical Properties of a Lippmann Lenticulated Sheet by Herbert E. Ives, *Journal of the Optical Society of America*, Mar. 1931.

Article from Scientific American, Sep. 1968, vol. 219, p. 91.

A Plywood Satellite-TV Dish, Radio-Electronics, Oct. 1985, pp. 58–61.

Article from Science Abstracts 1910, pp. 275–276.

OPTICAL IMAGING SYSTEM USING LENTICULAR TONE-PLATE ELEMENTS

FIELD OF THE INVENTION

The present invention is generally directed to an optical imaging system and specifically directed to a method and apparatus for storing, processing and reconstructing images of objects using planar arrays of optical elements.

DESCRIPTION OF THE PRIOR ART

Traditional optical systems consist of elements that operate serially on an incoming light signal. Because each element deals with the complete image, these elements must be carefully designed and built to compensate for distortions and aberrations which inevitably arise when a single element must handle an entire image by itself. This situation is analogous to the state of electronics in the 1950s. Systems were built by connecting individual active components with wires in boxes custom made for each application. This approach put a limit on the complexity of any design. Thus, 6-transistor radios, 5-tube radios, and 20-tube TVs were about as complex as mass produced items could be using this approach. Pocket calculators, digital wristwatches and portable computers were unthinkable with this technology. The transition from discrete electronic components to integrated circuits came from the ability to miniaturize components and manufacture many of them functionally connected at the same time.

Traditional optical imaging systems generally consisted of a series of individual components or lenses, each of which processed the entire image. This approach resulted in compromises in design since each element handled the entire field of the image simultaneously. It also resulted in large components which limited the complexity of the system. Because of the size scale involved, it has been far simpler to design and manufacture optical elements based on refraction rather than diffraction. There have been prior attempts to generate images using a planar array of small lenses or lenslets such as a fly's eye lens. The limitations on the implementation of this technology have restricted its use to various relatively coarse three-dimensional displays such as stereopanoramagrams and integral photography and in well known novelty items that change between two or several images as the viewing angle is changed. For example, integral photography generates images using an array of small lenslets to generate and store images. The lenslets used in integral photography are characterized by curved refractive surfaces which limits miniaturization to a level too coarse to be practical. This technology is also difficult to manufacture.

Optical components that work as a result of diffraction and wave interference of light waves have been known and used since French physicist Augustin Fresnel's invention of the zone plate in 1815. Zone plates are flat images that block specific phase components of a light signal producing an image in a manner analogous to a lens, but operating entirely on diffraction effects. Elements made of zone plates become simpler and more effective as their size decreases until their components become smaller than the wavelengths of the light involved. Additionally, the focal lengths of the zone plates become very short as their size decreases allowing for short distances between serial components. Being a planar image, as opposed to a curved surface, practical element densities of several hundred elements per linear inch can be manufactured using available printing and embossing processes.

The use of zone plates is well known in the prior art. For example, U.S. Pat. No. 3,545,854 to Olsson is directed to an optical system for producing a plurality of identical images of an object, such as for example, for making semi-conductor masks. The images of the object are focused onto an image plane by a plurality of identical zone plates, each comprising alternate opaque and transparent concentric zones. Each of these zone plates focuses an image of the pattern onto an image plate.

U.S. Pat. No. 3,547,546 to Schier is directed to an image forming device for the fabrication of semi-conductor masks. The device comprises a zone plate matrix having a plurality of zone plates arranged in substantially side-by-side relation. Each zone plate is a diffractory optical image forming device, similar to a Fresnel zone plate.

U.S. Pat. Nos. 3,993,401 to Strehlow, 4,036,552 to Lee, et al., and 4,095,875 to Lee, et al., all disclose retro-reflective materials made of a plurality of diffraction elements formed of Fresnel zone plates. The '552 patent to Lee, et al. discloses the making of a zone plate matrix by recording a plurality of Fresnel zone plate patterns onto a photosensitive medium and using that medium to make a stamper for embossing diffraction elements onto a plate.

U.S. Pat. No. 4,593,482 to Nose is directed to a reading apparatus, which divides an original image into a plurality of "micro-images" and reads the image information with the use of a photosensor through a plurality of imaging devices which include Fresnel zone plates.

While the prior art discloses optical imaging systems utilizing Fresnel zone plates, there is a need for a system having a higher degree of brightness and resolution and applicability to a broader range of image processing.

SUMMARY OF THE INVENTION

It is therefore an object of the present invention to produce an optical imaging system in which the overall quality of the image is enhanced.

It is further an object of the present invention to produce an optical imaging system which can be made from relatively inexpensive materials, which are resistent to stress and vibration and immune to electro-magnetic interference.

It is still further an object of the present invention to produce an optical imaging system which is adaptable to a variety of areas of visual presentation such as, for example, magnifiers, 3-dimensional (3-D) photography, information storage, 3-D X-ray photography, and animation sequences.

It is further an object of the present invention to produce an optical imaging system which is usable under ordinary ambient lighting conditions.

It is another object of the present invention to produce an optical imaging system which does not require lasers or special optical playback systems for use.

These and other objects are accomplished by the present invention in which there is an image generating and processing method and apparatus designed to manipulate images. The system consists of successive planes or screens of a parallel matrix of miniature optical diffraction elements preferably in the form of Fresnel zone plates, where each element is optimized to produce only a very small part of the resulting image.

The resulting image is a composite or integral image made up of typically several hundred thousand component points, each individually generated by a separate serial optical processing stream.

The present invention is further directed to an optical imaging system for creating an image of an object comprising at least a planar generation surface and a planar presentation surface separated by a substantially transparent medium. The planar generation surface includes a plurality of first diffraction elements. Each diffraction element represents a separate optical system. The diffraction elements may be in the form of a planar array of Fresnel zone plates or any other diffraction grating system known to the art. The substantially transparent medium has a thickness of at least the focal length of the diffraction system on the planar generation surface. The planar presentation surface includes a plurality of second diffraction elements defining a planar array of Fresnel zone plates. The centers of the Fresnel zone plates of the planar generation surface are in alignment with the centers of the zone plates on the planar presentation surface. The term "alignment", as used herein, means a predetermined angular relationship between opposing zone plates in the optical system.

The present invention is further directed to a method of viewing an image of an object comprising providing an optical imaging system as described above, shining light rays from a light source upon the object, whereby the light rays reflect off the object and pass through the plurality of diffraction elements of the generation plane to create a virtual image of the object on the resource plane for each of the plurality of first diffraction elements. Each zone plate of the presentation plane presents a point from a selected part of its virtual image. The term "point", as used herein, is the smallest resolvable area on the virtual image. The defined set of points is then integrated into a composite image perceivable by the viewer.

The present invention is also directed to a magnifier for magnifying the image of an object comprising a generation plane for encoding a plurality of images of the object into the system. The generation plane includes a planar array of a plurality of first zone plates in side-by-side relationship. Each of the first zone plates represents a separate optical element. The magnifier further comprises a presentation plane in substantially parallel alignment with the generation plane. The presentation plane decodes the plurality of images of the object and creates a composite of the plurality of images into a magnified composite image perceivable by the viewer. The presentation plane includes a planar array of a plurality of second zone plates in side-by-side relationship. Each of the second zone plates represents a separate optical element. The magnifier further includes a substantially transparent medium separating the generation plane and the presentation plane. The medium includes a resource plane in substantially parallel alignment with the generation plane and the presentation plane. The distance from the generation plane to the resource plane is the same as the focal length of the generation plane. The distance from the presentation plane to the resource plane is the same as the focal length of the presentation plane. However, the focal length of the presentation plane is shorter than the focal length of the generation plane, thereby creating a magnified image of the object.

The advantages of this technology are significant. First, the products of this technology can be made from relatively inexpensive materials. The manufacturing requirements also do not require massive re-tooling or a significantly different manufacturing technology base. Thus, systems already in use in graphic arts systems can be readily adapted to be used in the present invention.

Because the system of the present invention advantageously is operated by light waves as opposed to electricity, the apparatus components are resistent to stress and vibration and immune to electro-magnetic interference. Further, the optical imaging system is robust in that the failure of individual components does not significantly degrade the overall quality of the images as seen by the viewer. Thus, the loss of a few elements, i.e., zone plates, in one of the planes may result in the loss of a few pixels in the final or composite image; however, the viewer would not perceive this loss. The products are also visually enticing and thus adaptable to all areas of visual presentation.

The optical imaging system of the present invention has many applications. For example, the system can be used to produce an ultra-thin magnification sheet, specifically for use in dental and medical procedures. Further, the system also has application in three-dimensional black and white and color photography, three-dimensional X-ray imaging, information storage and retrieval systems, animated sign boards and advertising, and in the creation of 360° three-dimensional image forms.

Further objects, features and advantages of the invention will be apparent from the following detailed description when taken in conjunction with the accompanying drawings.

DETAILED DESCRIPTION OF THE INVENTION

In accordance with the invention, an optical imaging system for creating an image of an object is disclosed. The system comprises at least two planar arrays of diffraction elements. The first planar array of diffraction elements, the generation plane, encodes information into the optical system. The information is visual in nature and is encoded by light wave technology similar to the encoding of an image of an object onto photographic emulsion paper. The information is encoded in a manner usable in the system by diffraction elements.

The second planar array of diffraction elements, the presentation plane, decodes the information encoded by the generation plane and creates a viewable image which may be perceived by the user.

Situated between the generation and presentation planes is a substantially transparent medium which contains the resource plane in substantially parallel alignment with the generation plane and the presentation plane. The resource plane stores the encoded information in a manner ready to be used by the system. The resource plane may be either dynamic or static. In a dynamic system the resource plane may be an imaginary or translucent plane situated along the focal lengths of the diffraction elements making up the generation plane. The resource plane is the location of the encoded images of the object. These images are then processed by the presentation plane into a selected composite image which is perceived by the user. In a static system, the resource plane contains prerecorded information. The information may be photographically recorded or prerecorded by means of computer generated information or information generated by other means known to the art. The prerecorded information may be in the form of a color or spatial filter, a printed sheet, a grid, or a photograph.

The preferred diffraction elements consist of zone plates arranged in substantially side-by-side relation. For purposes of the present invention, zone plates or Fresnel zone plates are synonymous. A zone plate is a flat image that blocks specific phase components of a light signal producing an image in a manner analogous to a lens, but operating entirely on diffraction effects. Although zone plates having identical optical characteristics are preferred, ones having different characteristics are contemplated. Thus, zone plates optimized for one wavelength of radiation may be used throughout the matrix, or may be interspersed with zone plates optimized for a different wavelength. Reference is made to U.S. Pat. Nos. 3,545,854 to Olsson and 3,547,546 to Schier for a description of zone plates in general and methods of making them.

The zone plate is a diffractive optical image forming device comparable but superior to a pin hole. The pin hole is a primitive approach to forming an image and allows only the coarsest resolution. In contrast, the Fresnel-type zone plate, a flat bull's-eye image made of concentric, alternating clear and opaque rings, achieves a higher resolution and brightness. Pin holes are, in fact, just the center portion of these zone plates. The zones block specific phase components of a light signal, producing images in a manner analogous to a lens, but operating entirely on wave diffraction optics. An informative description of the zone plate and how it works is found in Sweetnan, David J. (October 1985) "A Plywood Satellite-TV Dish", *Radio Electronics*, pp. 58-61.

Historical attempts to create lens arrays relied on curved refractive material such as glass or clear plastic and thus were not amenable to miniaturization because of diffraction limitations on their size as well as the expense of manufacturing and alignment. The zone plates and other diffraction-based components do not share these limitations.

The elements made of zone plates become simpler and more effective as their size decreases until their components become smaller than the wavelengths of the light involved. Additionally, the focal lengths of the zone plates become very short as their size decreases allowing for short distances between serial components.

As opposed to curved lens surfaces, practical zone plate element densities of several hundred elements per linear inch can be manufactured using available printing and embossing techniques. In this way a matrix or planar array having a large number of zone plates, each having a large number of zones, may be formed. The diameter of the zone plate and the number of zones is controlled by several factors. For example, the minimum zone width is limited by the minimum resolvable line width of the instruments used in the zone plate fabrication, while the diameter of the zone plate is a function of the maximum image area to be covered and the wavelength of the image forming radiation. The determination of zone plate diameter and the minimum zone width fixes the number of zones. Thus the zone plate may be optimized for the wavelength to be used, the image area, the focal length and the width of the image detail. Therefore, depending upon the application, the number of zone plates per linear inch may be between one and three hundred or more. At this size, the focal length of the diffraction elements is between 100 and 1,000 microns.

The brightness of the image can be significantly increased if the bands of the zone plates are embossed such that phase components are retarded rather than blocked. By embossing the zone plate, the thickness of the medium is varied, but light is still allowed to pass. The wavelength through the thicker medium is shortened for a longer time. Therefore, at a point where the light is normally blocked, the phase is retarded, but allowed to shine through.

Additional improvements in brightness and resolution can be achieved by overlapping the outer zones of the adjacent zone plates slightly so that some of the outer rings share the same area on the screen. It is important to note that the bands are wave interference patterns, and the overlapping areas are comprised of recorded wave interference patterns having positive and negative components and not necessarily just an overlapping set of rings.

Figure 1:
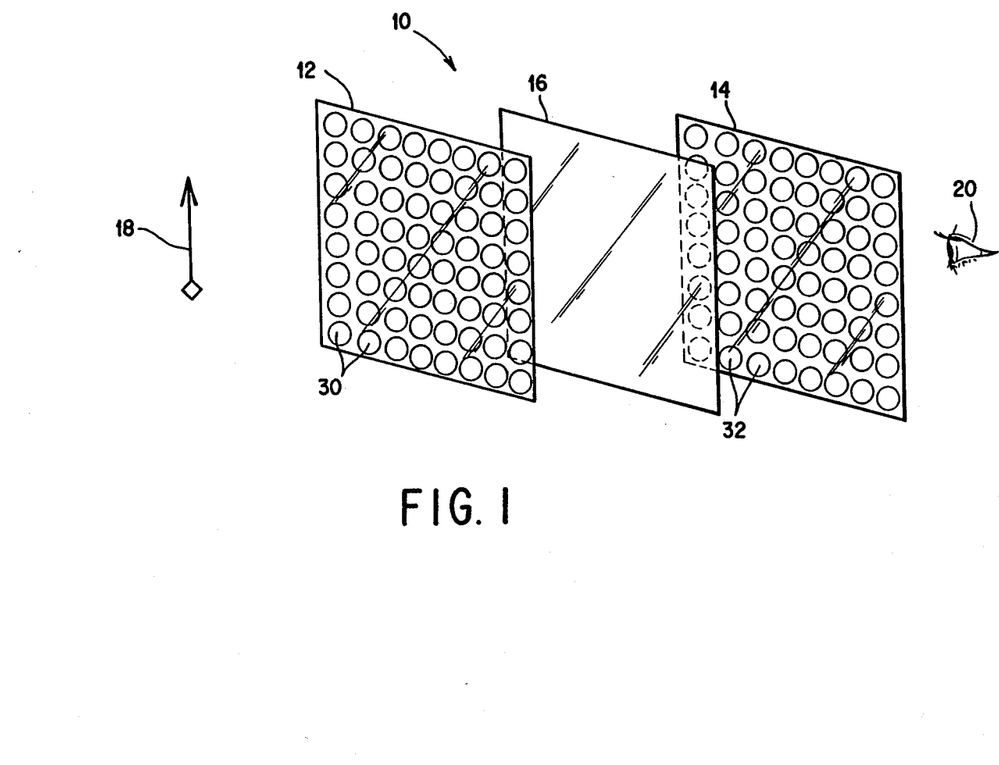
FIG. 1 is an exploded, perspective view of one embodiment of the optical imaging system of the present invention.

Referring now to the drawings, wherein the same features are marked by the same reference numerals throughout, FIG. 1 illustrates the optical imaging system of the present invention in its simplest mode. The optical imaging system of the present invention comprises at least two planar arrays or screens of diffraction elements separated by a substantially transparent medium. The first planar array, the generation plane 12, is a generally flat screen which encodes information and makes it available to the system. The second planar array, the presentation plane 14, is also a generally flat screen which recreates the image encoded by the generation plane 12. A third imaginary plane the resource plane 16 is the focal plane of the generation plane 12 and the presentation plane 14.

In this system, the generation plane 12 captures the information generated from the object 18 and provides a plurality of images of the object 18 at the resource plane 16. The multitude of images provided on the resource plane 16 is then recreated in enhanced form on the presentation plane 14. The presentation plane 14 creates a composite image which is perceived by the viewer 20.

The generation plane 12 consists of a plurality of optical elements illustrated as zone plates 30, which diffractively encode a multitude of smaller but intact images of the object 18 onto the resource plane 16. The generation plane 12 may be in the form of diffraction grating lines, zone plates, or a combination of the two. The only requirement is that the generation plane 12 creates sample sets for the presentation plane 16.

Figure 2:
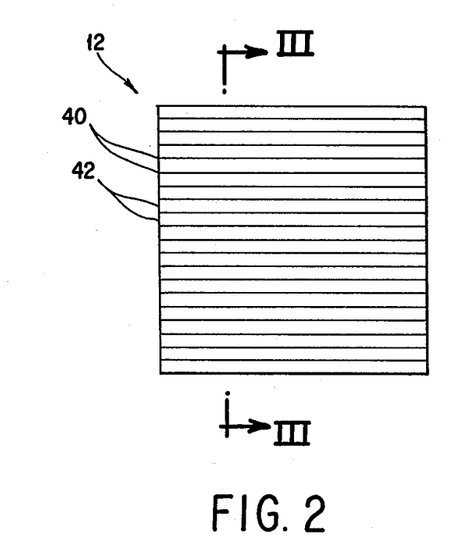
FIG. 2 is a front elevated view of one embodiment of the generation plane of the present invention.
Figure 3:
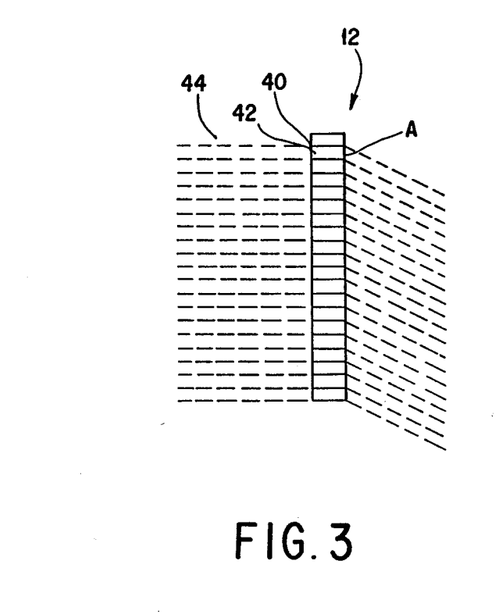
FIG. 3 is a side elevated view of the embodiment of FIG. 2 taken along lines III—III.

As illustrated in FIGS. 2 and 3, the generation plane 12 may be in the form of a diffraction grating system comprised of slits 40 which are equally spaced between grating spaces 42. This type of system would be used primarily to separate the color spectrum as is well known to the art. Referring now to FIG. 3, the dotted lines 44 represent the paths of light rays. The light rays pass through the slits 40, which diffract the light rays at a certain angle A.

Figure 4:
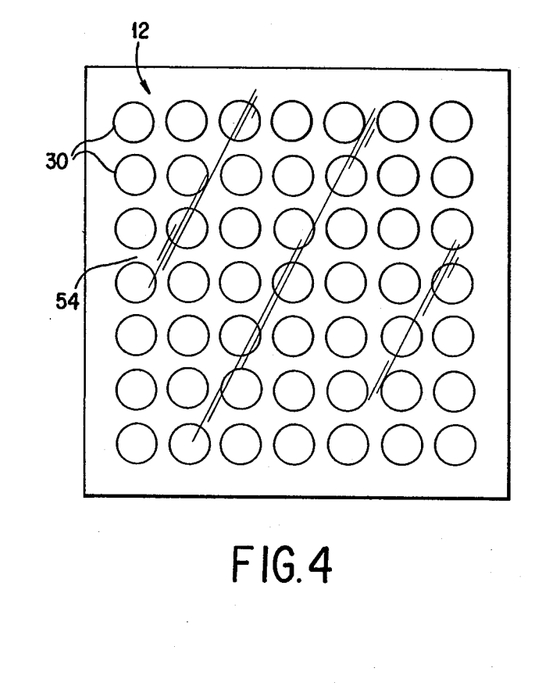
FIG. 4 is a front elevated view of another embodiment of the generation plane and of the presentation plane.
Figure 5:
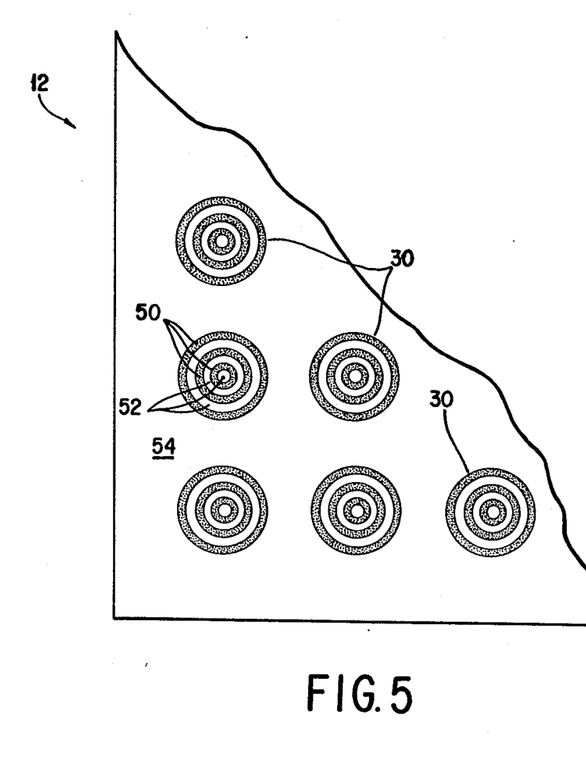
FIG. 5 is a partial front, elevated, magnified view of the embodiment of FIG. 4.

While diffraction gratings are within the scope of the present invention, the preferred generation plane 12 consists of a plurality of zone plates 30 in a planar array as illustrated in FIGS. 1, 4 and 5. Each zone plate 30 is formed from a series of concentric annular zones 50 and 52 of alternating transparent and non-transparent regions. The widths of the zones 50 and 52 generally decrease from the center outward in order to provide the best resolution of the image. Additionally, the outer zones of the zone plates 30 may overlap, thus increasing the size and density of zone plates on the plane 12 and decreasing the space 54 between the zone plates. Each zone plate 30 on the generation plane 12 generates a real image of the object 18 at the focal point on the resource plane 16. Thus, the generation plane 12 produces a plurality of substantially identical, extremely small, but accurate, virtual images of the object on the focal plane 16.

While the generation plane 12 may be one of several diffraction-type elements, the presentation plane 14 must be a zone plate array such as that illustrated in FIGS. 4 and 5. The presentation plane 14 selects samples from the multitude of repeating images on the resource plane 16 at a spatial frequency almost equal to the sampling rate of the resource plane 16, but increasing slightly as one moves off center. If the generation plane 12 consists of zone plates, the centers of the zone plates 32 are in alignment with the centers of the zone plates 30 from the generation plane 12.

Figure 6:
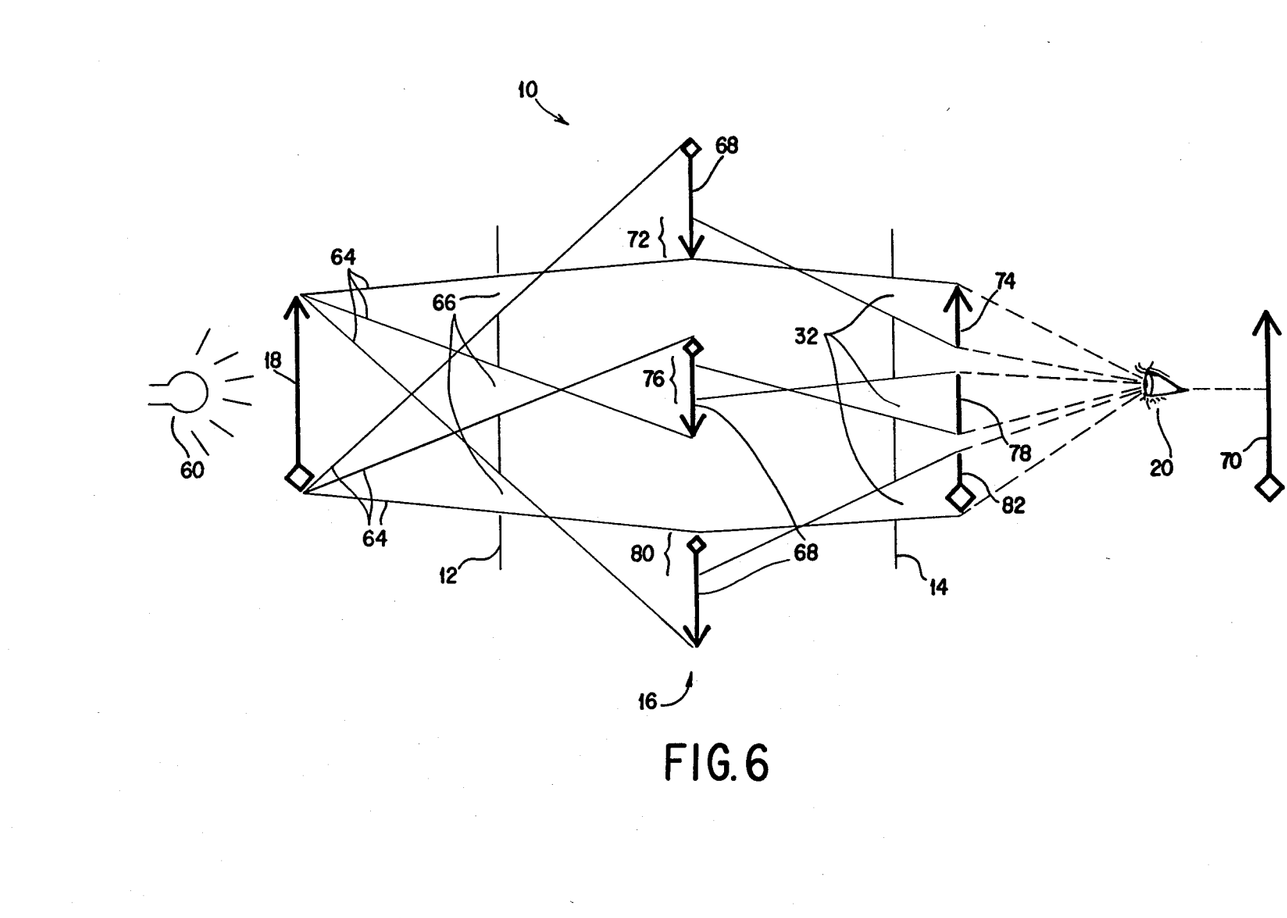
FIG. 6 is a side schematic view of the present invention.

Without wishing to be restricted to only one explanation of the invention, reference is made to FIG. 6 for a simplified explanation of the basic operation of the optical imaging system 10 of the present invention. Referring now to FIG. 6, there is illustrated a schematic of the optical imaging system 10. A light source 60 shines upon the object 18 causing light rays, generally indicated at 64, to reflect off the object 18 and pass through the diffraction openings 66 of the generation plane 12. The generation plane 12 may be a diffraction grating as illustrated in FIGS. 2 and 3, in which case the diffraction openings 66 will be diffraction slits 40. Alternatively, the generation plane 12 includes zone plates 30 as illustrated in FIGS. 4 and 5.

If the generation plane includes zone plates, the light rays 64 create virtual images 68 of the object 18 at the focal length, which is also the resource plane 16, of the generation plane 12. The resource plane 16 is an imaginary plane located in a substantially transparent medium between the generation plane 12 and the presentation plane 14. The medium must be substantially transparent in order to allow the appropriate light rays to shine through. It will be seen later in the specification that the resource plane 16 may include a photoemulsion plate in order to record the information encoded onto the resource plane from the generation plane.

The purpose of the presentation plane 14, which includes a planar array of zone plates 32, is to decode the virtual images 68 and translate the multitude of virtual images 68 into a composite image 70 which is perceived by the viewer 20. Depending upon the position of viewing by the viewer 20, each zone plate 32 will select a defined point or pixel from a virtual image 68 at the resource plane 16. For example, in FIG. 6, the eye of the viewer 20 selects a point 72 from the upper virtual image 68. The point 72 is registered through the upper zone plate 32 as a point in the upper third of the composite image 70, herein illustrated at 74. In the same manner the viewer 20 selects a point 76 from the middle virtual image 68, which is registered through the middle zone plate 32 as a point in the middle third 78 of the composite image 70. To finish the sequence, the viewer selects a point 80 from the lower virtual image 68, which is registered through the lower zone plate 32 as a point in the lower third 82 of the composite image 70.

The presentation plane 14 will collect the sets of points selected from each of the images on the resource plane 16, and integrate them into a composite image as perceived by the viewer 20. Due to this effect, the entire field of use is covered in a geometrically accurate manner. Thus, the viewer perceives a composite image created by the integration of defined dots from the array of images on the resource plane 16.

Because each zone plate 32 on the presentation plane 14 constitutes a separate miniature optical system which selects a defined point from its image at the resource plane 16, the ideal presentation plane will have as many zone plates per linear inch as possible in order to enhance the quality of the image. The number of zone plates per linear inch can range from as few as one to more than 300 depending upon the requirements of the system.

It is to be understood that the embodiment illustrated in FIG. 6 represents a simplified version of the optical imaging system for description purposes only. In reality the openings in both the generation plane and the presentation plane would number in the thousands.

The above-described matrices can be formed by photographic and photolithographic techniques, such as a step and repeat process or other means. Thus, reduced multiple images of a single master zone plate can be formed in a photoresist layer on a metal coated carrier plate and reproduced by etching, stripping, or stencil techniques or the like. Zone plate matrices can also be created by means of computer technology.

PREFERRED EMBODIMENTS OF INVENTION

The following descriptions of the invention are for exemplary purposes only and are not intended to encompass all possible uses and applications of the invention.

Magnifier

Figure 7:
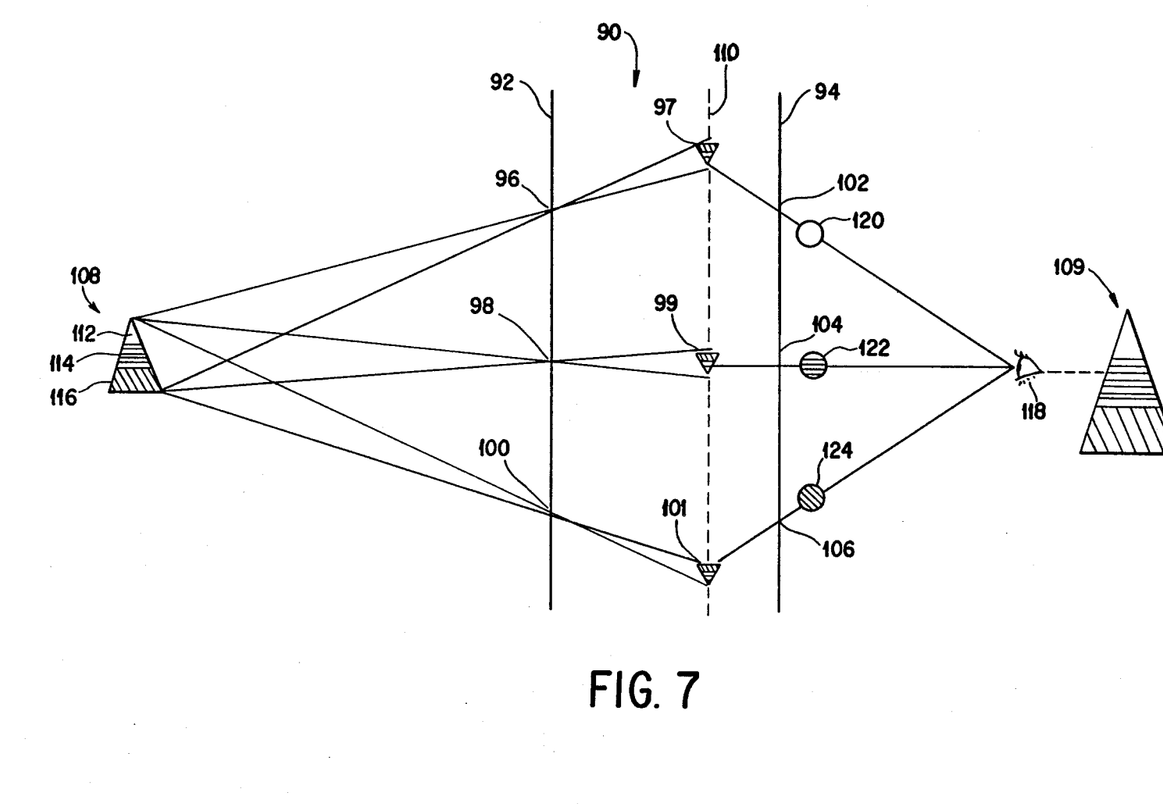
FIG. 7 is a side schematic view of the present invention illustrating the magnifier principle.

By carefully designing the geometries of the generation and presentation screens, an object viewed on one side of the screen may be sampled by the presentation screen in such a way as to produce an apparent magnified view of the object from the other side. Reference is now made to FIG. 7, which illustrates a simplistic example of this technology. FIG. 7 discloses a magnifier 90 consisting of a generation plane 92 and a presentation plane 94. In this simplified version, both the generation plane 92 and the presentation plane 94 each have three elements, i.e., zone plates, designated at 96, 98, 100, 102, 104 and 106 respectively. In reality, both the generation plane and the presentation plane are comprised of a plurality of zone plates, which can number in the thousands. The elements 96, 98 and 100 each generate inverted virtual images 97, 99 and 101 respectively of the object 108 at the resource plane 110, which is the focal point of each element 96. For purposes of description, the object 108 is illustrated as being in three sections 112, 114 and 116. The elements 102, 104 and 106 of the presentation plane have the same centers of alignment as the elements 96, 98 and 100 respectively, but the focal lengths of each element 102, 104 and 106 are shorter, and the distance from the virtual images 97, 99 and 101 to the presentation plane 94 is set accordingly. By the process described with respect to FIG. 6, the viewer 118 scans the presentation plane 94, observing all of the zone plates. Each zone plate decodes a point, herein illustrated at 120, 122 and 124, which represents a portion of the virtual images 97, 99 and 101. In the schematic view illustrated in FIG. 7, the viewer would only see different shades or intensities of points because there are only three zone plates. As the number of zone plates increases on both the generation plane 92 and the presentation plane 94, the viewer, scanning the presentation plane, perceives a composite image 109 of the object composed of a set of points or pixels selected from each virtual image by each zone plate on the presentation plane 94. Although the angular relationships between the resulting sample points correspond to the same points of the object 108, because of the difference in focal lengths of the two screens 92, 94, the composite image is composed of points selected from a small area of each of the virtual images. By careful selection of the geometry of the planes 92, 94, the composite image as seen by the viewer 118 is composed of a set of points, angularly selected, which covers only a small area of the object being viewed. The composite of the set of dots covers the entire field of the presentation plane 94 in a geometrically accurate manner to create an enlarged image 109 of object 108. Thus, the system acts as a magnifier with the added attraction that full parallax is maintained throughout the field of view designed into the system. The reverse geometry would result in a wide angle viewer.

A practical device using this approach would require at least a hundred, and more likely, two to three hundred elements per linear inch or more to produce high quality images. At that density, focal lengths of diffraction elements are in the 100 to 1,000 microns range. If the generation plane and the presentation plane are printed on two sides of a flexible sheet of transparent material, the images can be generated within the material and image magnifiers can be manufactured on a continuous sheet, which could be dispensed much the same way as aluminum foil.

Thus, through appropriate configuration of the system, a thin transparent magnification medium can be created. This magnification can be accomplished in a very short focal length, allowing for a magnification to at least 20 times through a medium less than ¼ inch thick. Such an invention is usable wherever a lightweight, inexpensive, powerful magnification tool is needed. Examples of applications for this invention include disposable magnifying spatter barriers for dental and medical practices, and a video screen magnifier.

Information Storage/Display System

Figure 8:
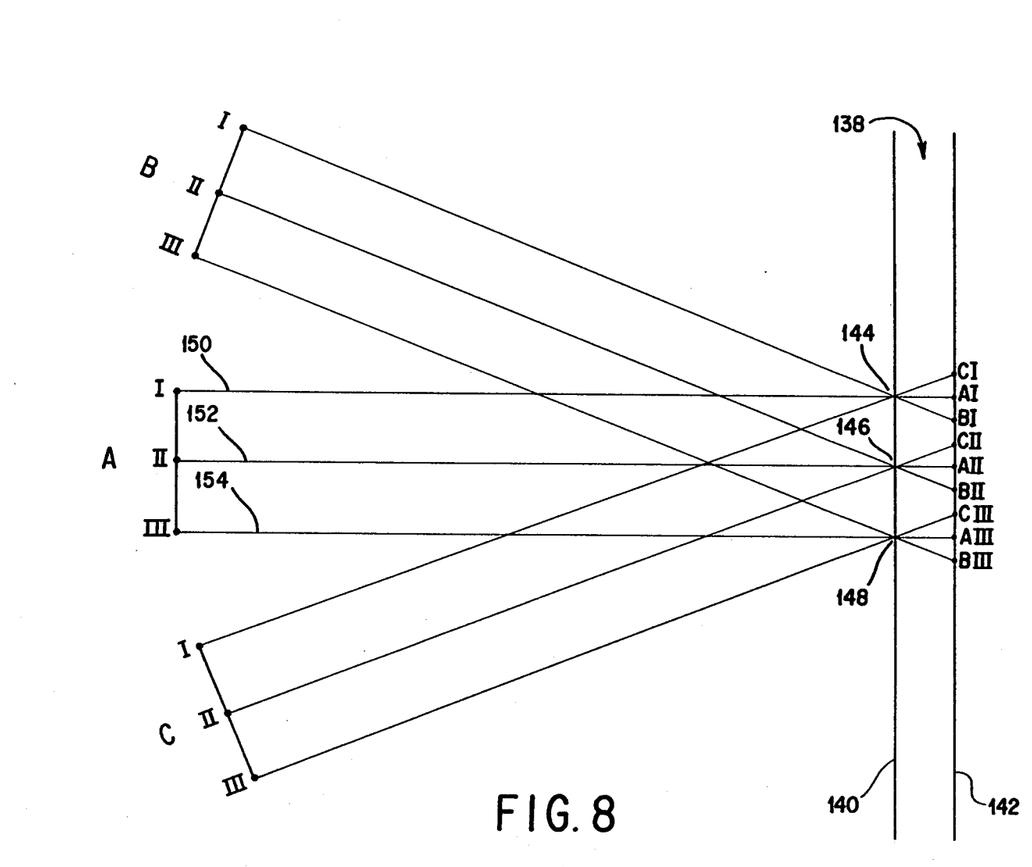
FIG. 8 is a side schematic view of the present invention as it applies to an information storage/retrieval system.

The optical imaging system of the present invention also has direct application to an information storage and retrieval system. Referring now to FIG. 8, there is illustrated an information storage system 138. For purposes of this explanation, three pages of information A, B, and C are illustrated. The pages A, B, and C may be in the form of written pages of information or transparencies. As illustrated, each page A, B, and C possesses three information sets I, II, and III. The optical imaging system 138 includes a generation plane 140 and a resource plane 142. The resource plane 142 is a static resource plane, being equipped to record the information encoded onto it. Therefore, the resource plane 142 is provided with a photographic emulsion plate or some other means to record information. The generation plane 140 is provided with zone plates. Although several hundred or even several thousand zone plates are contemplated, for purposes of explanation three zone plates 144, 146, and 148 are illustrated in FIG. 8.

The object of the information storage system 138 is to record several distinct bits of information, such as pages A, B, C, on one resource plane. For example, the image of page A, with discrete bits of information I, II, and III is projected through zone plates 144, 146, and 148 via light rays 150, 152, and 154, created by a light source (not shown) to the left of page A. The zone plates 144, 146, and 148 focus the image of page A onto discrete locations on the resource plane 142, herein illustrated at AI, AII, and AIII. After page A has been recorded on resource plane 142, page B is then recorded in the same manner with the exception that the angle of approach for page B is sufficiently different from page A such that the location of recording discrete points BI, BII, and BIII does not interfere with locations AI, AII, and AIII. Page C and following pages are recorded in like manner. Aside from photographically recording information onto the resource plane 142, it is within the scope of the present invention to provide other methods of recording information such as computerized recording procedures and digitizing the resource plane.

Retrieval of the information encoded on the resource plane essentially involves backtracking the procedures disclosed with respect to FIG. 8. If a photographic emulsion plate was used to record the information onto the resource plane 142, the emulsion plate would of course have to be developed according to procedures known to the art. The generation plane 140 would then become the presentation plane enabling the viewer to perceive the image recorded on the resource plane 142. The zone plates 144, 146, and 148 would decode the information recorded on the resource plane 142 into an image understandable by the viewer. With respect to FIG. 8, the viewer would be positioned at the location of page A in order to perceive the discrete points AI, AII, and AIII which are composited into an integrated page A by the presentation/generation plane 140. In order to view page B, the viewer would then be positioned at the page B location on FIG. 8 and so on.

Therefore, each angle of view presents a different set or screen of data, and different images or pages of information can be viewed depending upon the angle of observation of the presentation screen. Each angle of view actually selects a separate set of points comprising the image and does not have to be related to any other angle of view. Thus, many pages of print and graphics can be placed onto a single sheet or resource plane.

These devices could be made either to show an image by itself or, by leaving the material transparent, to superimpose an image onto what is viewed through it. Applications would include information retrieval systems, both directly viewable or projectable microfiche-type sheets in a format suitable for computer data storage. It has been calculated that the storage capacity on the resource plane can include at least 500 pages of information, compared to 270 for a microfiche machine. The information stored on the resource plane may be stored by means of a photographic emulsion sheet, computer generated sheets, or combinations or photocopies of both.

Three-Dimensional Photography

Three-dimensional photography, utilizing the optical imaging system of the present invention, is basically an extension of the previously described information storage and retrieval system. In this embodiment, a light sensitized emulsion is placed at the resource plane. The image is then recorded and then viewed through the presentation plane as a three-dimensional image of the object reconstructed for the viewer and demonstrating full parallax as the angle of view is changed. The difference between three-dimensional photography and the information storage and retrieval system is that in three-dimensional photography, the light rays reflecting off the object project the intensity of the image of each point of detail of the object at every angle between the object and every zone plate on the generation plane. Therefore, for every point on the object there exists a separate intensity recorded on the resource plane for every zone plate of the generation plane.

Figure 9:
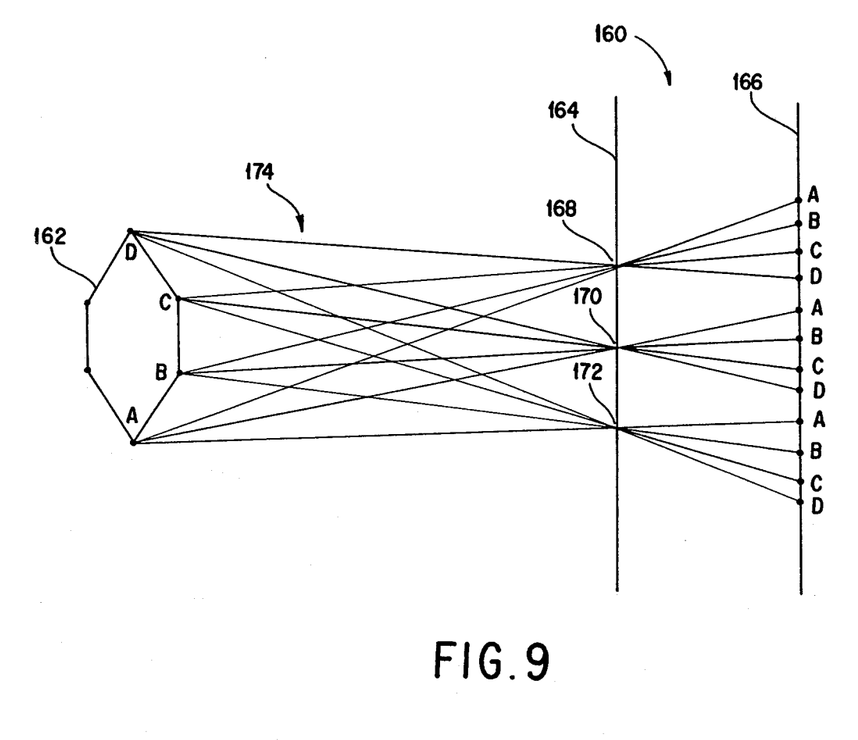
FIG. 9 is a side schematic view of the present invention as it applies to three-dimensional photography.

Referring now to FIG. 9, there is illustrated in schematic form an optical imaging system 160 for recording a three-dimensional photograph of a three-dimensional object 162. The system 160 includes a generation plane 164 and a resource plane 166. In this simplistic example, the generation plane 164 contains three zone plates 168, 170, and 172. A light source (not illustrated) reflects light rays, generally indicated at 174 off of every point of the object 162 and at every angle between the object points and the zone plates of the generation plane 164. For illustration purposes only, reference is being made to four points A, B, C, and D of the object 162. Thus, in this example, three light rays are shown being reflected off each point A-D of the object 162 and being passed through each of the three zone plates 168, 170, and 172 respectively. The zone plates focus the image of each point A-D onto discrete locations on the resource plane 166 as illustrated. Each point is recorded onto the resource plane 166 in a manner similar to that described with respect to the information storage and retrieval system. Of importance to the three-dimensional photography concept is the fact that each point recorded on the resource plane 166 reflects the intensity of the particular light ray carrying the image of that point through a zone plate.

The image of the object may be viewed three-dimensionally in the same manner as that described with respect to the information storage and retrieval system. Due to the varying intensities of each point recorded on the resource plane, a viewer viewing the photograph through a presentation plane perceives a composited three-dimensional image of the object.

This embodiment can also be explained with comparison to the half-tone process that allows photographs to be produced on newsprint. If a magnifier is placed over a newsprint photograph, one can see that it is composed of many little dots. The mind sees this pattern of dots as a picture. The system of the present invention is based on the notion of images composed of dots, but each dot is an image generated by an active optical system, i.e., an individual zone plate or diffraction grating system. To practically manufacture such a huge number of precision optical components and have them all working together, diffraction-based elements must be designed to be located, in parallel, on successive planes or flat sheets of material. Being flat images themselves, diffraction based optical components are easily miniaturized and printed in sheets. This allows millions of components to be manufactured in a single manufacturing step. The result thus consists of layers of massively parallel microscopic optical components which generate pointillist dynamic images when viewed.

An example of a screen suitable for use in the present invention is as follows: A sheet of transparent film stock 5 inches square having a refractive index of 1.48 with the screen printed on one side and photographic emulsion on the other side would require recording a 26.3 degree field of view for stereoscopic viewing at a minimum of 15 inches. If the thickness of this sheet is 6 mils (152 microns), the image centers are computed to be spaced at 71 microns which would result in a potential 358 points per inch and, for light at 0.55 microns wavelength, the center zone of each element would have a diameter of 15 microns.

In the case of 3-D photography, light from a subject is processed by the generation plane and then recorded on a photographic emulsion at the resource plane. When the film is exposed, each optical component separates the light by incoming directions at its point on the plane and stores separate intensity information for each direction on the film. When the film is processed, aligned with the presentation plane, and viewed, the optical components reconstruct all of the separate directions and intensities of light for each point and the eye puts all the individual points together and sees the original scene. The difference between this composite view and the composite produced by a newsprint halftone photograph is that in a photograph produced by the system of the present invention, the dynamics of the system changes the intensity of the points as the viewer shifts position, thus providing three-dimensional images that are not just stereoscopic views, but dynamic images that shift with the movements of the viewer. In this process, one is able to see around objects as the angle of view of the picture shifts, much as looking through a window at objects outside.

With appropriate screens manufactured as part of photographic film, high quality three-dimensional film can be manufactured for use in many applications not amenable to holographic techniques such as X-ray images, large displays, and portraits. Normally the generation plane and the presentation plane would have the same focal lengths. Since only one is used at a time, this allows the same screen to be used for both. However, if different focal length screens were used for recording and viewing, a magnified or wide angle image would result.

With suitable framing, windows with recorded views could be made. Along those same lines, floor tiles could be made with repeating patterns, such as grass, water, etc. Likewise, ceiling panels with sky and clouds would add an openness to a room not possible with other building materials.

Thus, the system of the present invention can produce three-dimensional images with a wide range of view in monochrome and color, without the use of complicated laser holography-based technology.

Three-dimensional x-ray imaging can be accomplished in substantially the manner as herein described three-dimensional photography techniques making allowances for the peculiar wavelength and penetration characteristics of light from that portion of the spectrum.

Animation Sequences

The optical imaging system of the present invention also has application to animation sequences. Animation sequences can be created according to the process described above with respect to the information storage and retrieval system. An animation series may be recorded on a sheet of photographic paper. Changing the angle of view will then create an animation effect, e.g., a moving arrow could be seen, indicating a closed traffic lane ahead. Applications would include advertising displays, signage, and animated highway displays.

Measurement Devices

By projecting live images onto a prerecorded resource plane, systems can be produced which will superimpose information onto the live image or subtracting information from it for measurement or shape recognition purposes. This has application in distance, shape and angular measurement technology.

Spatial filters can be implemented using this technique. A screen that blocks out a spatial frequency component can be inserted in the resource plane, and the resulting apparent image will thus be modified. The filtering screen would be comprised of the desired pattern repeated over the entire surface aligned with the centers of the zone plates and placed at the resource plane. Complex filtering of this type can produce a range of products that can recognize and accentuate shapes viewed through them.

Three-Dimensional 360° Images

By bending or curving the planes of the optical system, the optical imaging system of the present invention also has application in the storage of three-dimensional objects. For example, museums may want to store such items as sculptures, jewelry, coins, and other antiquities. Educational institutions will want to store instructional items from such disciplines as biology, physics, architecture, geology, etc.

It is understood that the invention is not confined to the particular construction and arrangement herein illustrated and described. For example, magnifiers, viewers, three-dimensional recording and playback of images and data, and optical processing devices can be built using the techniques described that have advantages over other methods. Many variations are possible, as are embraced within the scope of the following claims.

What is claimed is:

1. An optical imaging system for storing, processing and reconstructing an image of an object, comprising:
   (a) a generation plane, which encodes information concerning the object into the system, the generation plane including a plurality of first diffraction elements, each of which represents a separate optical element; and
   (b) a presentation plane, which decodes the information encoded by the generation plane, the presentation plane including a plurality of second diffraction elements defining a planar array of first circular zone plates;
   wherein the generation plane and the presentation plane are separated by a substantially transparent medium having a thickness of at least the sum of the focal lengths of the generation plane and the presentation plane, wherein the substantially transparent medium comprises a resource plane at the focal lengths of the generation plane and the presentation plane.

2. The system of claim 1 wherein the first diffraction elements include a diffraction grating.

3. The system of claim 1 wherein the first diffraction elements include a planar array of second zone plates in adjacent side-by-side relationship providing a one-to-one correspondence of each of the second zone plates in the generation plane to one of the first zone plates in the presentation plane.

4. The system of claim 3 wherein the first and second zone plates have centers, whereby the centers of each of the first zone plates are in alignment with the centers of one of the second zone plates.

5. The system of claim 3 wherein the planar arrays of first and second zone plates have identical optical characteristics.

6. The system of claim 3 comprising at least one zone plate per linear inch in the first and second diffraction elements.

7. The system of claim 3 comprising at least one hundred zone plates per linear inch in the first and second diffraction elements.

8. The system of claim 3 wherein the outer zones of the adjacent zone plates are overlapped.

9. The system of claim 1 wherein the resource plane is dynamic, the resource plane being an imaginary plane located along the focal lengths of the first diffraction elements.

10. The system of claim 1, wherein the resource plane is static, the resource plane comprising prerecorded information.

11. The system of claim 10, wherein the prerecorded information is photographically recorded.

12. The system of claim 10, wherein the prerecorded information is computer generated.

13. The system of claim 10, wherein the prerecorded information is in the form of a filter.

14. The system of claim 10, wherein the prerecorded information is in the form of a photograph.

15. The system of claim 1 wherein the generation plane comprises a plurality of optical elements, the optical elements diffractively encoding a multitude of miniature intact images of the object at the resource plane.

16. The system of claim 1 wherein the focal lengths of the second diffraction elements of the presentation plane are equal to the focal lengths of the first diffraction elements of the generation plane.

17. The system of claim 1 wherein the focal lengths of the second diffraction elements of the presentation plane are shorter than the focal lengths of the first diffraction elements of the generation plane resulting in an enlarged image of the object.

18. The system of claim 1 wherein the substantially transparent medium includes a photoemulsion plate to record information encoded into the system by the generation plane.

19. An optical imaging system for storing, processing and reconstructing an image of an object, comprising:
(a) a generation plane for encoding information concerning the object into the system, the generation plane including a plurality of first zone plates in planar array;
(b) a presentation plane in substantially parallel alignment with the generation plane, the presentation plane decoding the information encoded by the generation plane, the presentation plane further including a plurality of second zone plates in a planar array, wherein the first and second zone plates have centers and the centers of each of the first zone plates are in alignment with the centers of one of the second zone plates providing a one-to-one correspondence of each of the first zone plates in the generation plane to one of the second zone plates in the presentation plane; and
(c) a substantially transparent medium separating the generation plane and the presentation plane wherein the substantially transparent medium has a thickness of at least the sum of the focal lengths of the generation plane and the presentation plane, the substantially transparent medium including a resource plane at the focal length of the generation plane and the presentation plane.

20. The system of claim 19, wherein the resource plane is dynamic, the resource plane being an imaginary plane located along the focal lengths of the first diffraction elements.

21. The system of claim 19, wherein the resource plane is static, the resource plane comprising prerecorded information.

22. The system of claim 21, wherein the prerecorded information is in the form of a photograph.

23. The system of claim 19, wherein the focal lengths of the second zone plates are substantially similar to the focal lengths of the first zone plates.

24. The system of claim 19, wherein the focal lengths of the second zone plates are shorter than the focal lengths of the first zone plates resulting in an enlarged image of the object.

25. A method of viewing an image of an object, comprising:
(a) providing an optical imaging system comprising:
(1) a generation plane for encoding information concerning the object into the system, the generation plane having a focal length and including a plurality of first diffraction elements, one of which represents a separate optical element,
(2) a presentation plane in substantially parallel alignment with the generation plane for decoding the information encoded by the generation plane, the presentation plane having a focal length and including a plurality of second diffraction elements defining a planar array of zone plates, and
(3) a substantially transparent medium separating the generation plane and the presentation plane the substantially transparent medium having a thickness of at least the sum of the focal lengths of the generation plane and the presentation plane, wherein the substantially transparent medium defines a resource plane at the focal length of the generation plane and the presentation plane;
(b) shining light rays from a length source upon the object, whereby the light rays reflect off the object and pass through the plurality of first diffraction elements of the generation plane and create a virtual image of the object for each of the plurality of first diffraction elements on the resource plane, whereby each zone plate of the presentation plane presents a point from a selected part of the virtual image; and
(c) integrating the defined sets of points into a composite image.

26. The method of claim 25 wherein the first diffraction elements include a diffraction grating.

27. The method of claim 25 wherein the first diffraction elements include a planar array of second zone plates in adjacent side-by-side relationship.

28. The method of claim 27 wherein the first and second zone plates have centers, whereby the centers of each of the first zone plates are in alignment with the centers of one of the zone plates providing a one-to-one correspondence of each of the first zone plates in the generation plane to one of the second zone plates in the presentation plane.

29. The method of claim 27 wherein the planar arrays of first and second zone plates have identical optical characteristics.

30. The method of claim 27 comprising at least one zone plate per linear inch in the first and second diffraction elements.

31. The method of claim 27 wherein the generation plane comprises a plurality of optical elements, the optical elements diffractively encoding a multitude of miniature intact images of the object at the focal length of the generation plane.

32. The method of claim 27 wherein the focal lengths of the second diffraction elements of the presentation plane are equal to the focal lengths of the first diffraction elements of the generation plane.

33. The method of claim 27 wherein the focal lengths of the second diffraction elements of the presentation plane are shorter than the focal lengths of the first diffraction elements of the generation plane resulting in an enlarged image of the objects.

34. The method of claim 25 wherein the resource plane is dynamic, the resource plane being an imaginary plane located along the focal lengths of the first diffraction elements.

35. The method of claim 25, wherein the resource plane is static, the resource plane including prerecorded information.

36. The method of claim 35 wherein the prerecorded information is in the form of a photograph.

37. A magnifier for magnifying the image of an object, comprising:
(a) a generation plane for encoding a plurality of images of the object into the system, the generation plane including a planar array of a plurality of first zone plates in side-by-side relationship, each of the first zone plates representing a separate optical element;
(b) a presentation plane, in substantially parallel alignment with the generation plane, for decoding the plurality of images of the objects and compositing the plurality of images into a magnified composite image, the presentation plane including a planar array of a plurality of second zone plates in side-by-side relationship, each of the second zone plates representating a separate optical element wherein the first zone plates are provided in a one-to-one correspondence to one of the second zone plates in the presentation plane; and (c) a substantially transparent medium separating the generation plane and the presentation plane, the substantially transparent medium including resource plane in substantially parallel alignment with the generation plane and the presentation plane;

whereby the distance from the generation plane to the resource plane is the same as the focal length of the generation plane and the distance from the presentation plane to the resource plane is the same as the focal length of the presentation plane; and whereby the focal length of the presentation plane is shorter than the focal length of the generation plane.

38. The magnifier of claim 37 wherein the first and second zone plates have centers, whereby the centers of each of the first zone plates are in alignment with the centers of at least one of the second zone plates.

39. The magnifier of claim 37 wherein the resource plane further includes information prerecorded on it.

40. The magnifier of claim 39 the prerecorded information is photographically recorded.

41. The magnifier of claim 37 comprising at least one hundred zone plates per linear inch in the generation and presentation planes.

42. The magnifier of claim 37 comprising at least one hundred zone plates per linear inch in the generation and presentation planes.

43. A method for storing and retrieving discrete bits of information comprising:
(a) providing an optical imaging system comprising:
(1) a generation plane for encoding the information into the system, the generation plane including a plurality of first diffraction elements, each of which represents a separate optical element,
(2) a presentation plane for decoding the information encoded by the generation plane, the presentation plane including a plurality of second diffraction elements defining a planar array of zone plates, and
(3) a resource plane at the focal length of the generation plane, wherein the resource plane includes means to record the information encoded by the generation plane;
(b) focusing the image of a first information source at a first angle onto discrete locations on the resource plane through the first diffraction elements, whereby each of the first diffraction elements segregates a set of distinct points from the first information source such that each of the set of distinct points is recorded on a discrete location on the resource plane;
(c) retrieving the information recorded on the resource plane through the presentation plane, wherein each zone plate of the presentation plane selects a distinct point recorded on the resource plane; and
(d) integrating the sets of distinct points into a composite image readily perceivable when viewed at an angle which is the same as the first angle.

44. The method of claim 43, wherein the generation plane is the same as the presentation plane.

45. The method of claim 43, wherein a plurality of information sources are recorded on the resource plane such that each of the plurality of information sources is focused onto discrete locations on the resource plane at separate angles.

46. The method of claim 43, wherein the first diffraction elements include a planar array of second zone plates in adjacent side-by-side relationship.

47. The method of claim 46, wherein the first and second zone plates have centers, whereby the centers of each of the first zone plates are in alignment with the centers of at least one of the second zone plates.

48. The method of claim 43, wherein the means to record the information is a photographic emulsion plate.

49. A method for taking a three-dimensional photograph, comprising:
(a) providing an optical imaging system comprising:
(1) a generation plane for encoding the information into the system, the generation plane including a plurality of first diffraction elements, each of which represents a separate optical element,
(2) a presentation plane for decoding the information encoded by the generation plane, the presentation plane including a plurality of second diffraction elements defining a planar array of zone plates, and
(3) a resource plane at the focal length of the generation plane, wherein the resource plane includes means to record the information encoded by the generation plane;
(b) focusing the image of a three-dimensional object wherein the object includes a plurality of points of detail, onto discrete locations on the resource plane through the first diffraction element, whereby each point of detail is projected through each of the first diffraction elements on the generation plane such that the intensity of the image of each point of detail is recorded at discrete locations on the resource plane;
(c) viewing the points of detail recorded on the resource plane through the presentation plane, wherein each zone plate of the presentation plane selects a distinct point of detail, the selected distinct point of detail depending upon the angle of view on the presentation plane; and
(d) integrating the distinct points of detail into a composite image which is perceived as a composited three-dimensional image of the object.

50. The method of claim 49, wherein the first diffraction elements include a planar array of second zone plates in adjacent side-by-side relationship.

51. The method of claim 50, wherein the first and second zone plates have centers, whereby the centers of each of the first zone plates are in alignment with the centers of at least one of the second zone plates.

52. The method of claim 49, wherein the generation plane is the same as the presentation plane.

* * * * *